United States Patent [19]
Davis et al.

[11] Patent Number: 5,632,480
[45] Date of Patent: May 27, 1997

[54] BASKETBALL GOAL SUPPORT HAVING REMOVABLE BALLAST AND CONTINUOUSLY ADJUSTABLE POLE

[75] Inventors: Mark E. Davis, Wauwatosa; Ronald A. White, N. Prairie, both of Wis.

[73] Assignee: Huffy Corporation, Miamisburg, Ohio

[21] Appl. No.: 337,884

[22] Filed: Nov. 14, 1994

[51] Int. Cl.$^6$ .................................................. F16M 11/00
[52] U.S. Cl. .................. 473/483; 248/161; 248/408; 248/910; 403/109; 473/479
[58] Field of Search ............... 273/1.5 R; 248/910, 248/407–414, 157, 423, 161; 403/109, 377

[56] References Cited

U.S. PATENT DOCUMENTS

| | | | |
|---|---|---|---|
| 1,988,037 | 1/1935 | Furrer | 248/407 |
| 2,586,724 | 2/1952 | Sanneback | 248/408 X |
| 2,986,395 | 5/1961 | Sheftel | 273/1.5 R |
| 3,341,197 | 9/1967 | Bottorff | 273/1.5 R |
| 3,722,903 | 3/1973 | Jones | 403/109 X |
| 3,841,631 | 10/1974 | Dolan | 273/1.5 R |
| 4,412,679 | 11/1983 | Mahoney et al. | 273/1.5 R |
| 4,640,211 | 2/1987 | Namur | 403/109 X |
| 4,757,778 | 7/1988 | Scaglia | 403/109 X |
| 4,759,545 | 7/1988 | Grable | 273/1.5 R |
| 4,913,388 | 4/1990 | McCant | 248/125 |
| 5,082,261 | 1/1992 | Pelfrey | 273/1.5 R |
| 5,112,023 | 5/1992 | Sowers | 248/519 |
| 5,145,153 | 9/1992 | Glynn | 248/910 X |
| 5,158,281 | 10/1992 | Williams | 248/910 X |
| 5,163,676 | 11/1992 | Taub | 273/1.5 R |
| 5,207,407 | 5/1993 | Fitzsimmons et al. | 248/910 X |
| 5,375,835 | 12/1994 | Van Nimwegen et al. | 248/910 X |

FOREIGN PATENT DOCUMENTS

| | | | |
|---|---|---|---|
| 19177 | of 1914 | United Kingdom | 248/408 |
| 908055 | 10/1962 | United Kingdom | 273/1.5 R |

*Primary Examiner*—Paul E. Shapiro
*Attorney, Agent, or Firm*—Howrey & Simon; Richard S. Meyer

[57] ABSTRACT

A basketball goal support including a base, a ballast tank and an adjustable pole. The ballast tank is formed as a hollow structure for receiving a fluid such as water to provide ballasting weight to the base. The ballast tank is removably attached to the base to facilitate filling and emptying of the ballast tank as well as transportation of the base. The pole includes upper and lower tubes and an elastomeric ring extending around the upper tube. The elastomeric ring may be positioned at a substantially infinite number of locations along the upper tube to thereby define the position of the upper tube relative to the lower tube.

34 Claims, 10 Drawing Sheets

BASKETBALL GOAL SUPPORT HAVING REMOVABLE BALLAST AND CONTINUOUSLY ADJUSTABLE POLE

FIELD OF THE INVENTION

The present invention relates to basketball goal supports and, more particularly, to a portable basketball goal support having a removable ballast and an adjustable support pole.

BACKGROUND OF THE INVENTION

Portable basketball goal supports are a popular alternative to permanent mounting systems, such as those that are used to mount the goal on a building, or those which make use of a pole supported in the ground. An advantage of portable support systems is that they typically can be easily moved and selectively positioned at different locations, as desired.

Known support systems usually include a ballast for weighting down the support whereby the support is prevented from moving during use of the goal, such as during a basketball game. For example, several prior art supports include an adjustable pole for mounting the goal, and a base in the form of a tank for holding water which provides the ballasting weight.

In setting up a portable basketball goal system, the support is positioned in a desired location and a hose is run from a water spigot to the support to fill the ballast tank. If it is necessary to move the goal to a different location, the ballast tank must usually be emptied in order to lighten the system sufficiently for easy transportation. Thus, prior art support systems typically require that the goal be set up near a water spigot or at least within reach of a hose.

In addition, prior support systems include means for adjusting the length of the goal supporting pole to a plurality of predetermined positions. Adjustable poles typically include upper and lower tubes in telescoping relationship to each other with the lower tube including a hole for receiving a locking pin, and the upper tube including a plurality of longitudinally spaced holes. The pin may be inserted through the holes in the upper and lower tubes to define different height positions for the goal. Accordingly, shortcomings associated with many prior art support systems include the inability to provide for adjustment heights other than the predetermined heights established by the location of the holes for receiving the locking pin and the possibility of losing the locking pin when it is not engaged with one of the holes in the pole.

SUMMARY OF THE INVENTION

The present invention provides a basketball goal support which is easily transported, and which also provides for selection of a wide variety of height adjustments for the goal.

In one aspect of the invention, a basketball goal support is provided including a base for supporting a pole, the base including an upper surface defining a ballast receiving area. The support further includes a ballast for positioning on the upper surface within the ballast receiving area for weighting down the base. The ballast is removable from the base, and the ballast and base include cooperating means for maintaining the ballast within the ballast receiving area.

The base further includes a pole mount located at a rear end of the base wherein the pole mount defines an aperture for receiving the pole. A ramp portion extends downwardly and forwardly from the pole mount and is received within an elongated complementary shaped recess in the ballast. In addition, a keyhole aperture is formed in the pole mount adjacent to the ramp portion for receiving a latching collar formed on the ballast whereby the ballast is held in position within the ballast receiving area of the base.

The ballast is in the form of a tank and includes a fill spout for receiving a fluid, such as water. The latching collar is formed on the fill spout at a rearward portion of the ballast. The ballast may be removed from the base to fill or empty the ballast, or to facilitate movement of the support to a different location.

In a further aspect of the invention, the pole includes upper and lower tubes each having a rounded triangular cross-sectional shape. The upper tube extends in telescoping relationship within the lower tube. An elastomeric band is provided extending around the upper tube for engagement with a lip formed at an upper end of the lower tube whereby movement of the upper tube into the lower tube is limited. The elastomeric band may be positioned continuously along the upper tube to an infinite number of positions whereby the height of the support defined by the position of the upper tube may be selected. The upper tube further includes a plurality of dimples or positioning indicia located at predetermined longitudinal locations along the upper tube to provide predetermined reference marks for adjusting the height of the upper tube.

Therefore, it is an object of the present invention to provide a basketball goal support having a removable ballast tank for facilitating setup and transportation of the support.

It is a further object of the present invention to provide a basketball goal support including a pole formed of upper and lower tubes wherein the tubes may be adjusted continuously along the length of one of the tubes.

Other objects and advantages of the invention will be apparent from the following description, the accompanying drawings and the appended claims.

DETAILED DESCRIPTION OF THE PREFERRED EMBODIMENT

Figure 1:
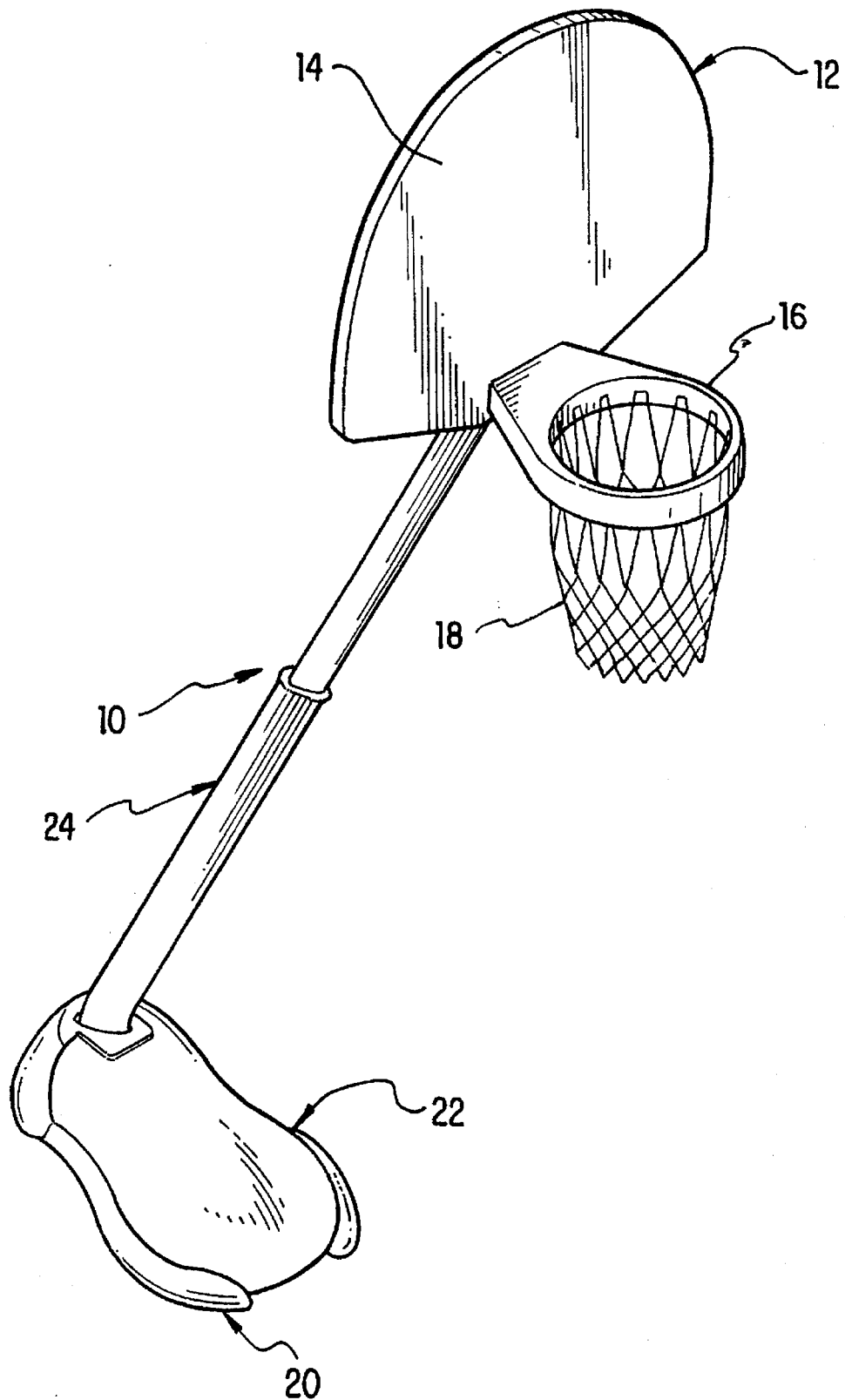
FIG. 1 is a perspective view of the basketball goal support system of the present invention including a goal mounted thereto.

Referring initially to FIG. 1, the basketball goal support 10 of the present invention is shown in combination with a conventional basketball goal 12 mounted to an upper end of the support 10. The goal 12 includes a backboard 14 supporting a rim 16 and net 18. The support 10 includes a base 20, a ballast tank 22 supported on the base 20 and a support pole 24 which is also mounted to the base 20 and which supports the goal 12. The base 20, ballast tank 22 and support pole 24 are preferably formed of a blow molded plastic material.

Figure 2:
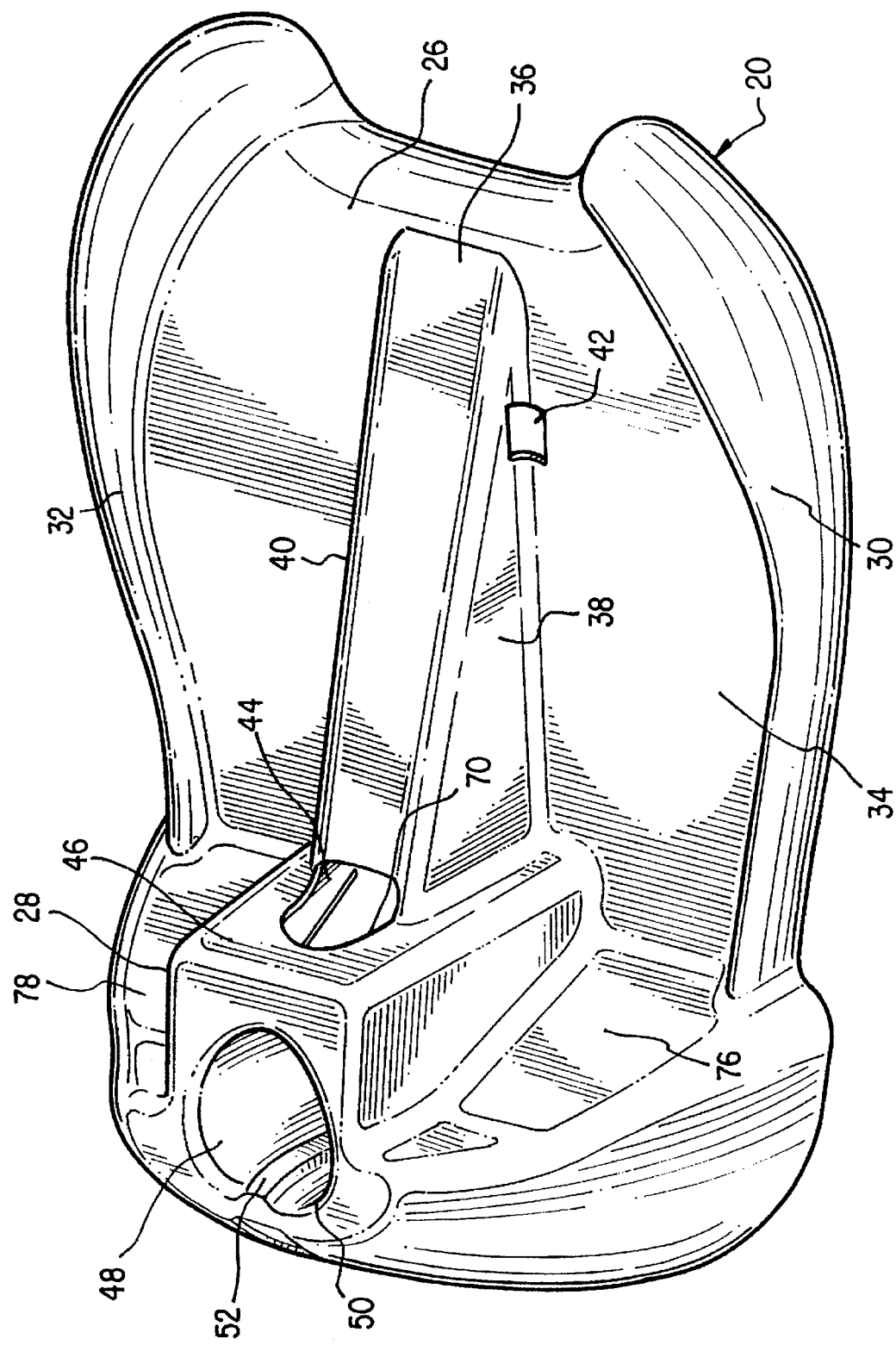
FIG. 2 is top perspective view of the base for the support.

Referring to FIG. 2, the base 20 includes an upper surface 26 and a pole mount 28 rising above the upper surface 26 at a rearward end of the base 20. A pair of flange portions 30, 32 extend upwardly from the upper surface 26 and extend in a longitudinal direction forwardly from the pole mount 28 along opposing sides of the base 20. The pole mount 28 and flange portions 30, 32 surround and define a ballast receiving area 34 on the upper surface 26.

The base 20 further includes a ramp portion 36 extending forwardly and downwardly from the pole mount 28 to a forward edge of the base 20. The ramp portion 36 includes opposing sides 38, 40, and snap openings or apertures 42 are defined in the opposing sides 38, 40 adjacent to the upper surface 26. In addition, a keyhole opening 44 is defined in the pole mount 28 at a front surface 46 of the pole mount 28 adjacent to and extending into the ramp portion 36. The keyhole aperture 44 is provided for cooperating with the ballast tank 22, as will be further described below.

Figure 3:
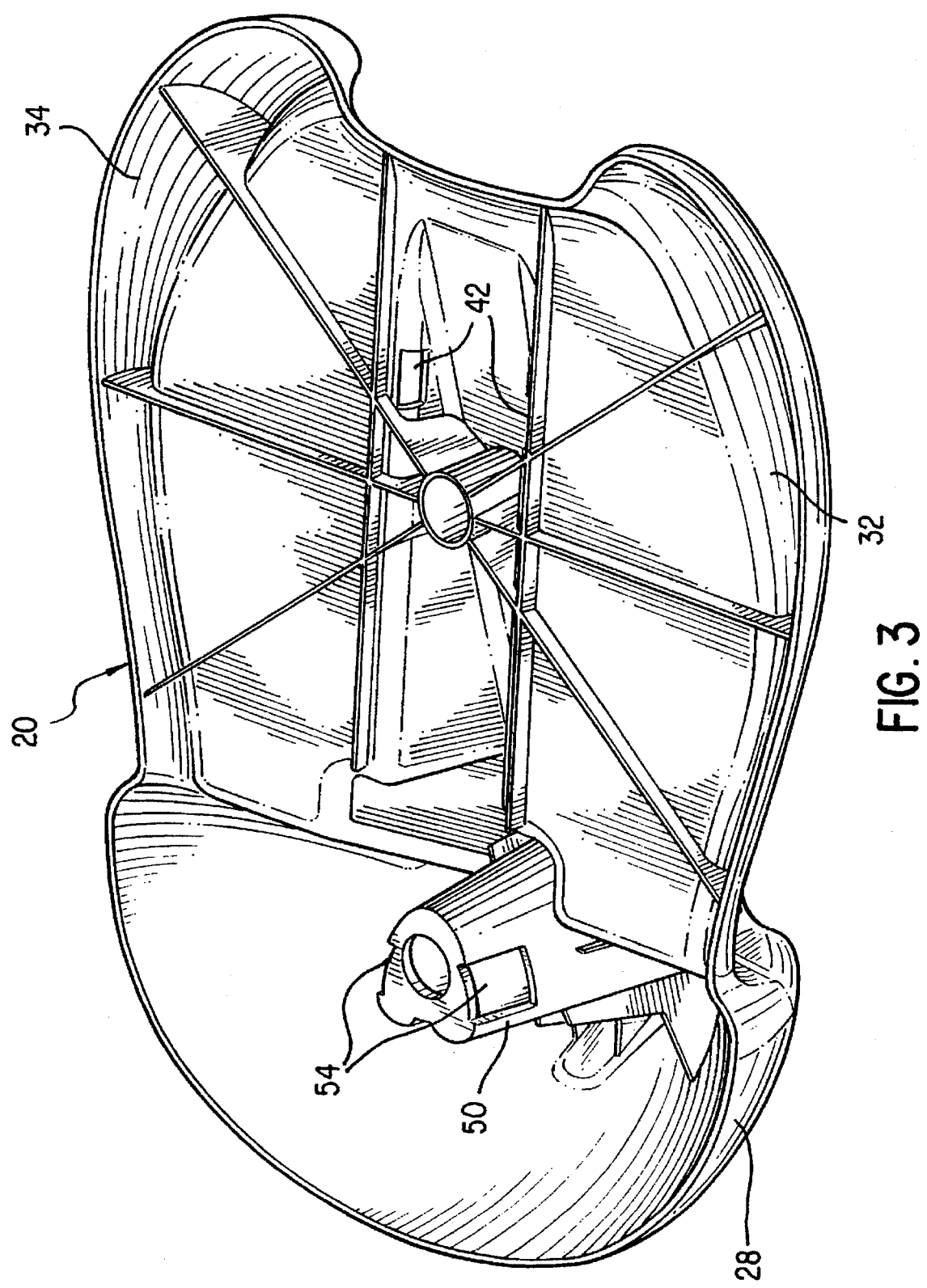
FIG. 3 is a bottom perspective view of the base for the support.

Referring to FIGS. 2 and 3, the pole mount 28 further includes a pole mounting aperture 48 defined by a pole mount shell 50. The aperture 48 and shell 50 have a generally rounded triangular shape including a rib 52 extending longitudinally of the shell 50 providing the shell 50 with a heart shaped configuration. In addition, the walls of the shell 50 angle inwardly in a downward direction.

The shell 50 further includes a pair of tang openings 54 located on opposing sides of the shell 50. The aperture 48 is adapted to receive a lower portion of the pole 24 and the tang openings 54 are adapted to lock the pole 24 to the base 20, as which will be described further below.

Figure 4:
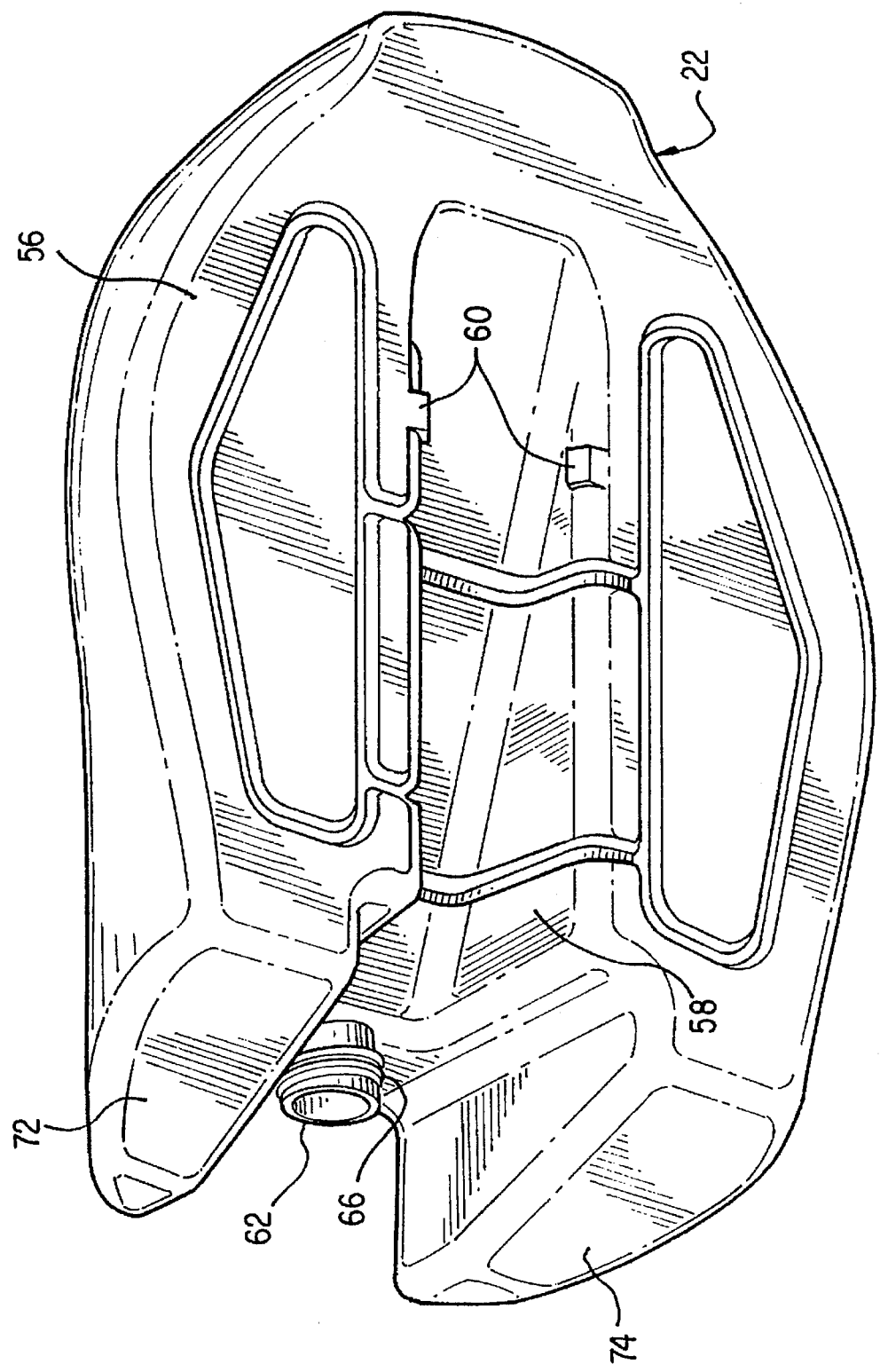
FIG. 4 is a bottom perspective view of the ballast tank for the support.

Referring to FIG. 4, the ballast tank 22 includes a lower substantially planar surface 56 which is configured to rest on the upper surface 26 in the ballast receiving area 34 of the base 20. The ballast tank 22 is preferably formed as a hollow member and includes an elongated recess 58 which has a shape complementary to the shape of the ramp portion 36 whereby the recess 58 is adapted to receive the ramp portion 36 when the ballast tank 22 is in position on the base 20. A pair of snap tabs 60 extend from the lower surface 56 of the ballast tank 22 toward the elongated recess 58. The snap tabs 60 are adapted to engage within the snap openings 42 of the base 20 to facilitate maintaining the ballast tank 22 in position within the ballast receiving area 34. In particular, the snap tabs 60 resist upward movement of the ballast tank 22 relative to the base 20.

Figure 6:
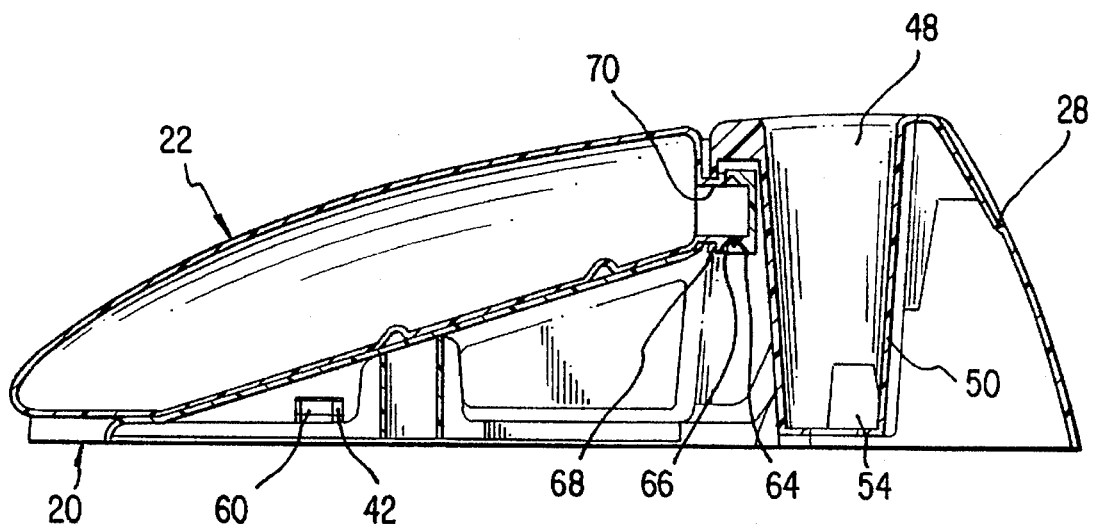
FIG. 6 is a cross-sectional view taken centrally through the assembly of FIG. 5.

The ballast tank 22 further includes a fill spout 62 which is threaded for engaging a fill spout cap 64 (see FIG. 6). A latching collar 66 extends around the fill spout 62 and defines a forwardly facing latching surface 68. The latching surface 68 is adapted to engage against an upper edge 70 of the keyhole aperture 44 for preventing forward movement of the ballast tank 22 relative to the base 20.

Figure 5:
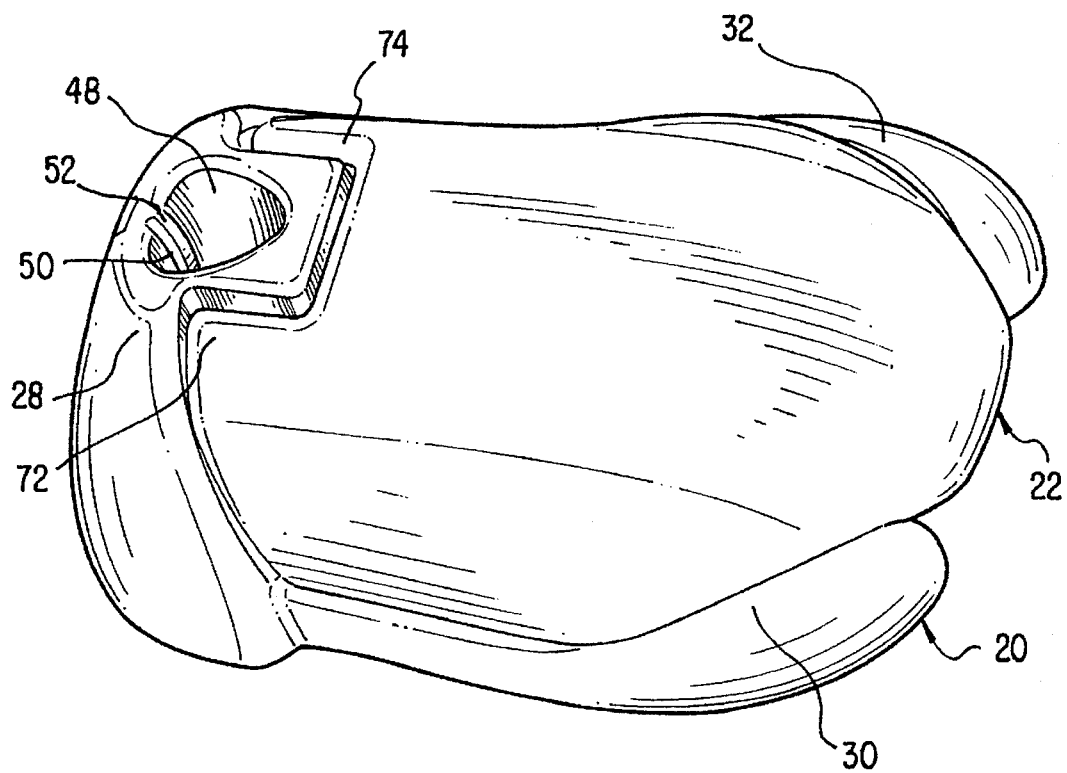
FIG. 5 is a perspective view showing the ballast tank in position on the base.

Further, the ballast tank 22 includes a pair of rearwardly extending arms 72, 74 which extend into recess areas 76, 78 of the base 20. It should be noted that the cooperating ramp portion 36 and elongated recess 58, and the cooperating arm portions 72, 74 and recess areas 76, 78 facilitate maintaining the ballast tank 22 in a centered position on the base 20. In addition, the upwardly extending flange portions 30, 32 cooperate with outside edges of the ballast tank 22 to further maintain the ballast tank 22 in a centered position, as seen in FIG. 5.

The ballast tank 22 is mounted to the base 20 by angling the front end of the ballast tank 22 above a rear end thereof and inserting the fill spout 62 through the keyhole aperture 44. Angling of the ballast tank 22 positions the latching collar 66 at an angle whereby it may be inserted past the upper edge 70 of the keyhole aperture 44. With the collar 66 located behind the keyhole aperture 44, the front end of the ballast tank 22 is pivoted downwardly to cause the snap tabs 60 to snap into the snap openings 42. In this position, the latching surface 68 on the latching collar 66 is aligned such that it extends above the upper edge 70 of the keyhole aperture 44 to prevent forward movement of the ballast tank 22. Thus, the ballast tank 22 is substantially immovably locked on the base 20, as seen in FIG. 6.

Referring to FIGS. 7–10, the support pole 24 comprises an upper tube 80 and a lower tube 82 wherein the upper tube 80 is received in telescoping relationship within the lower tube 82. The upper and lower tubes are formed having a rounded triangular cross-sectional shape similar to the cross-sectional shape of the pole mounting aperture 48. In addition, the upper and lower tubes 80, 82 include an inwardly extending rib area 84, 86 complementary to the rib 52. The shape of the upper and lower tubes 80, 82, as well as the shape of the aperture 48 prevents the tubes 80, 82 from rotating relative to each other and prevents the pole 24 from rotating relative to the base 20.

Figure 9:
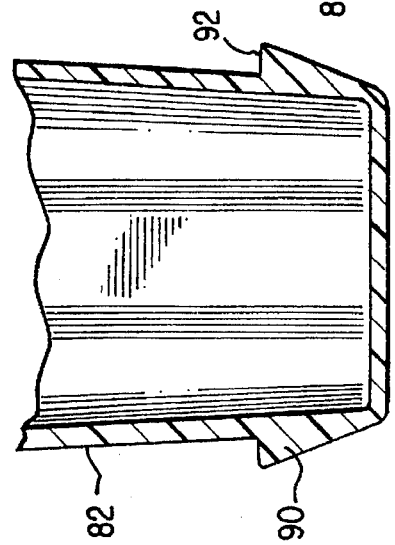
FIG. 9 is a cross-sectional view taken along line 9—9 in FIG. 7.
Figure 8:
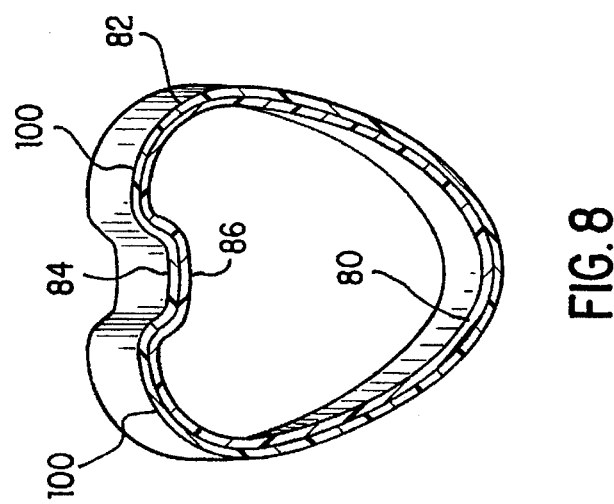
FIG. 8 is a cross-sectional view taken along line 8—8 in FIG. 7.

Referring to FIG. 9, the lower tube 82 includes an angled lower end 88 which is tapered inwardly in a downward direction for reception in the pole mounting aperture 48. A pair of locking tangs 90, 92 are located on opposite sides of the lower end 88 for engaging within the tang openings 54 of the shell 50 whereby the lower tube 82 is maintained in engagement within the pole mounting aperture 48. It should be noted that the angle of the lower end 88 permits the mounting pole 24 to angle forwardly over the base 20 and ballast tank 22, as illustrated in FIG. 1.

Figure 7:
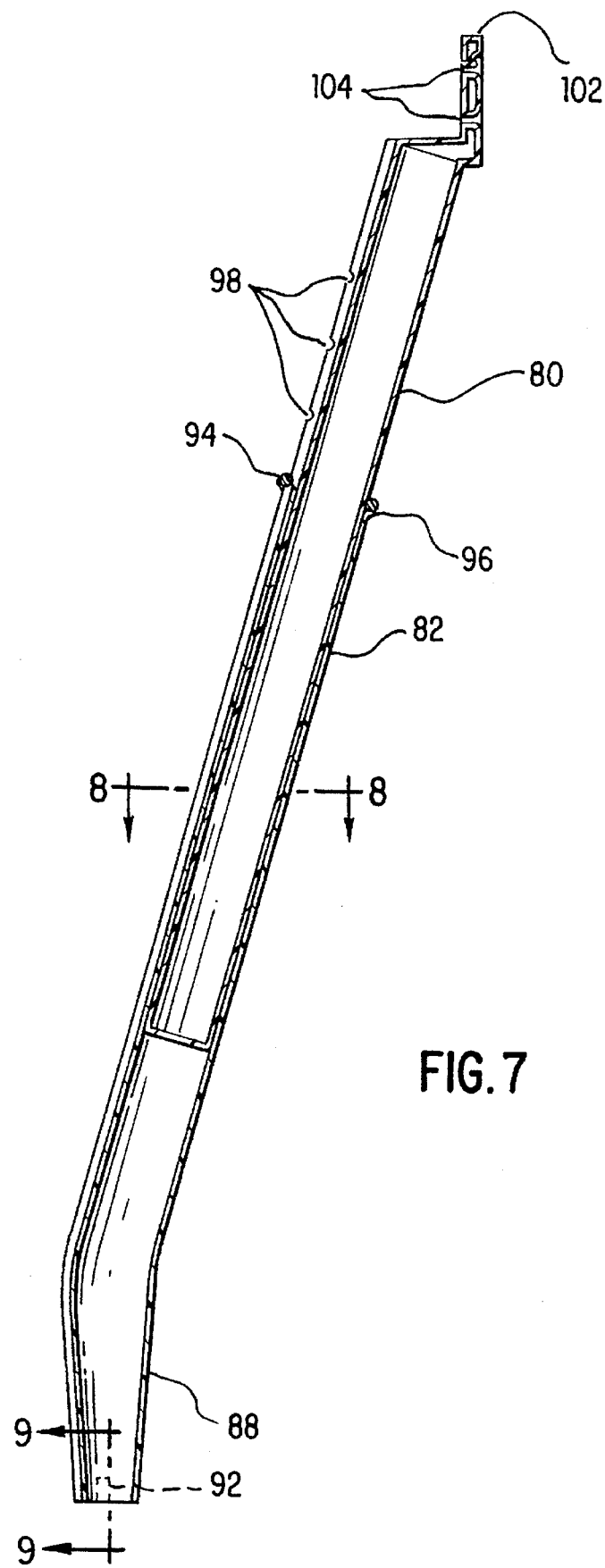
FIG. 7 is a cross-sectional view taken centrally through the support pole of the support.
Figure 10:
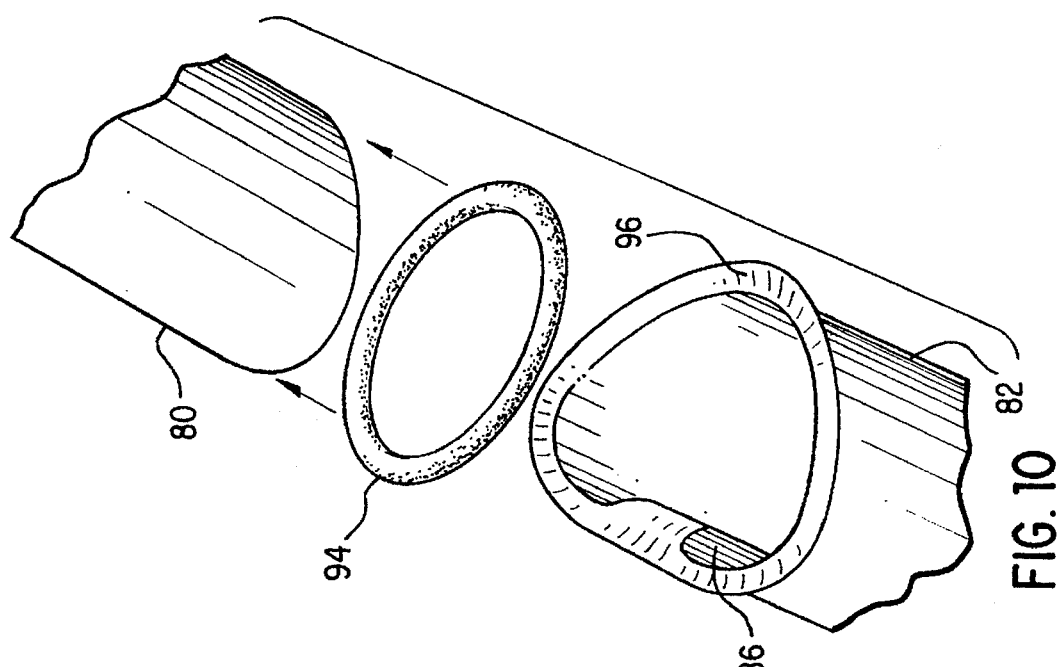
FIG. 10 is a perspective view showing assembly of the ends of the upper and lower tubes of the support pole with the elastomeric positioning band.

As may be seen in FIGS. 7 and 10, a positioning band 94 is provided extending around the upper tube 80 and engaging an outwardly angled lip 96 on an upper end of the lower tube 82. The positioning band is preferably an O-ring formed of an elastomeric material such as BUNA-N wherein the band must be stretched or expanded slightly to place it around the upper tube 80. The upper and lower tubes 80, 82 are preferably formed of a blow molded plastic such that the elastomeric positioning band 94 will engage the upper tube 80 with a high coefficient of friction when the upper tube 80 is in position within the lower tube 82, the band 94 will rest against the lip 96 of the lower tube 82 and will substantially prevent the upper tube 80 from moving further into the lower tube 82 beyond the position at which the band 94 engages the upper tube 80. Thus, the band 94 is continuously adjustable along the upper tube 80 to provide a substantially infinite number of selectable positions for the height of the upper tube 80 relative to the lower tube 82.

In addition, the upper tube is provided with a plurality of positioning dimples 98 formed in rearward lobes 100 (see FIG. 8) of the upper tube 80. The dimples 98 are located at longitudinally spaced locations and provide positioning indicia which may be used as reference points for locating the goal 12 at a particular desired height. Further, the upper pole 80 may be provided with numerical height indicating markings adjacent to the dimples 98 to provide an operator with information relating to the particular height provided by the individual dimple locations. It should be noted that although the band may be located at any of the dimple locations 98, it is not necessary that the band 94 be positioned at these discrete locations such that the band may be positioned at any intermediate location since the frictional contact between the band 94 and the upper tube 80 will prevent the upper tube 80 from moving into the lower tube 84 past the location of the band 94.

The upper tube 80 is further provided with a goal mounting bracket 102 including apertures 104. The goal 12 may be mounted to the bracket 102 by means of bolts or other fasteners extending through the backboard 14 and apertures 104 in a conventional manner.

From the above description, it should be apparent that the present basketball goal support 10 facilitates setup of the goal by providing a removable ballast tank 22 which may be removed from the base 20 for filling or emptying of the ballast tank 22. In addition, the ballast tank 22 may be removed to facilitate transportation of the support system 10 to a different location.

Further, the support pole 24 for the present invention enables the goal 12 to be located at a plurality of continuously variable positions by expanding the positioning ring 94 and positioning it at a desired location along the upper tube 80 of the support pole 24. It should also be noted that since the ring 94 extends around the upper tube 80, it will not be subject to being lost or misplaced, as could happen with prior art systems incorporating a positioning pin.

Figure 11:
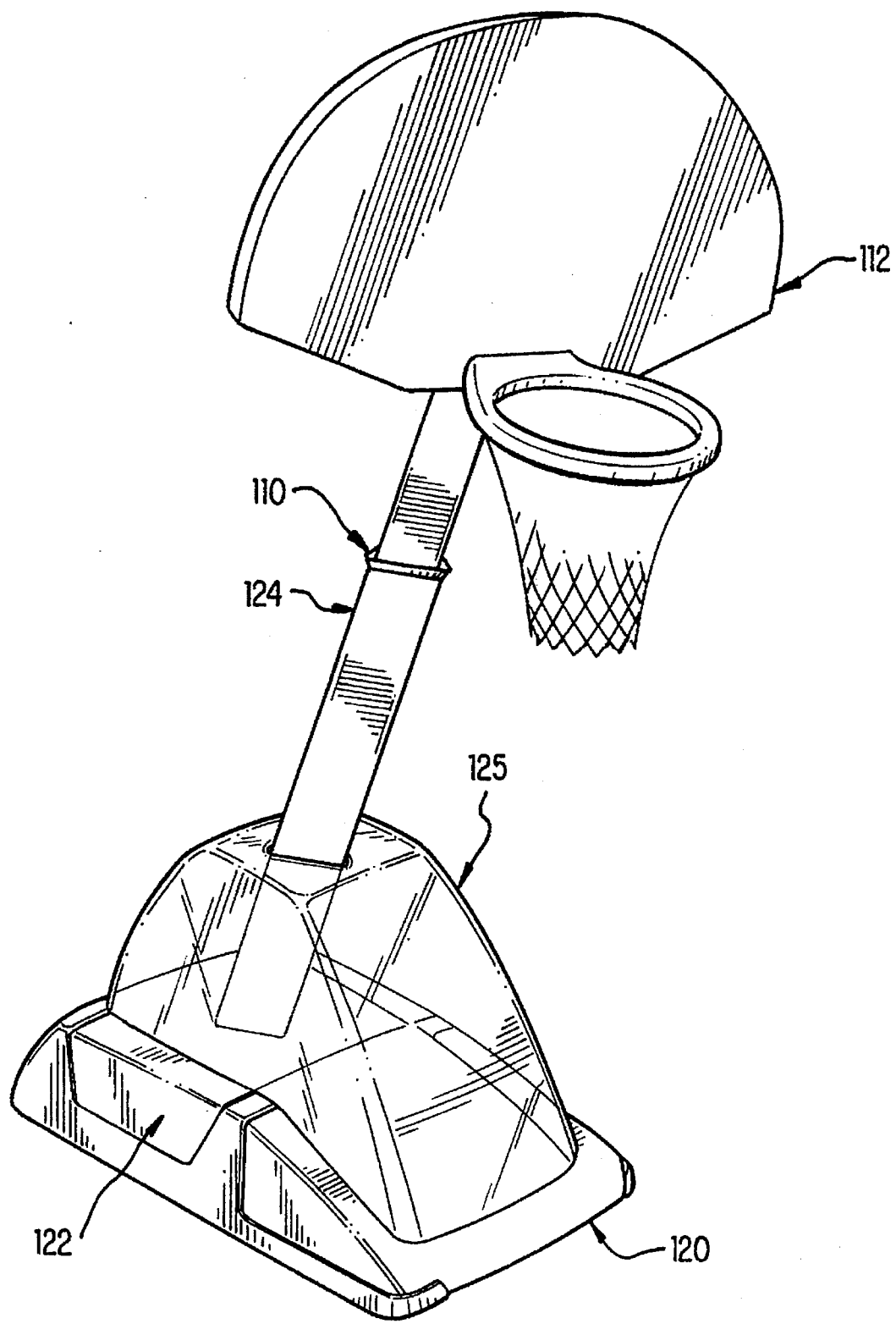
FIG. 11 is a perspective view of an alternative embodiment of the basketball goal support system for the present invention.
Figure 12:
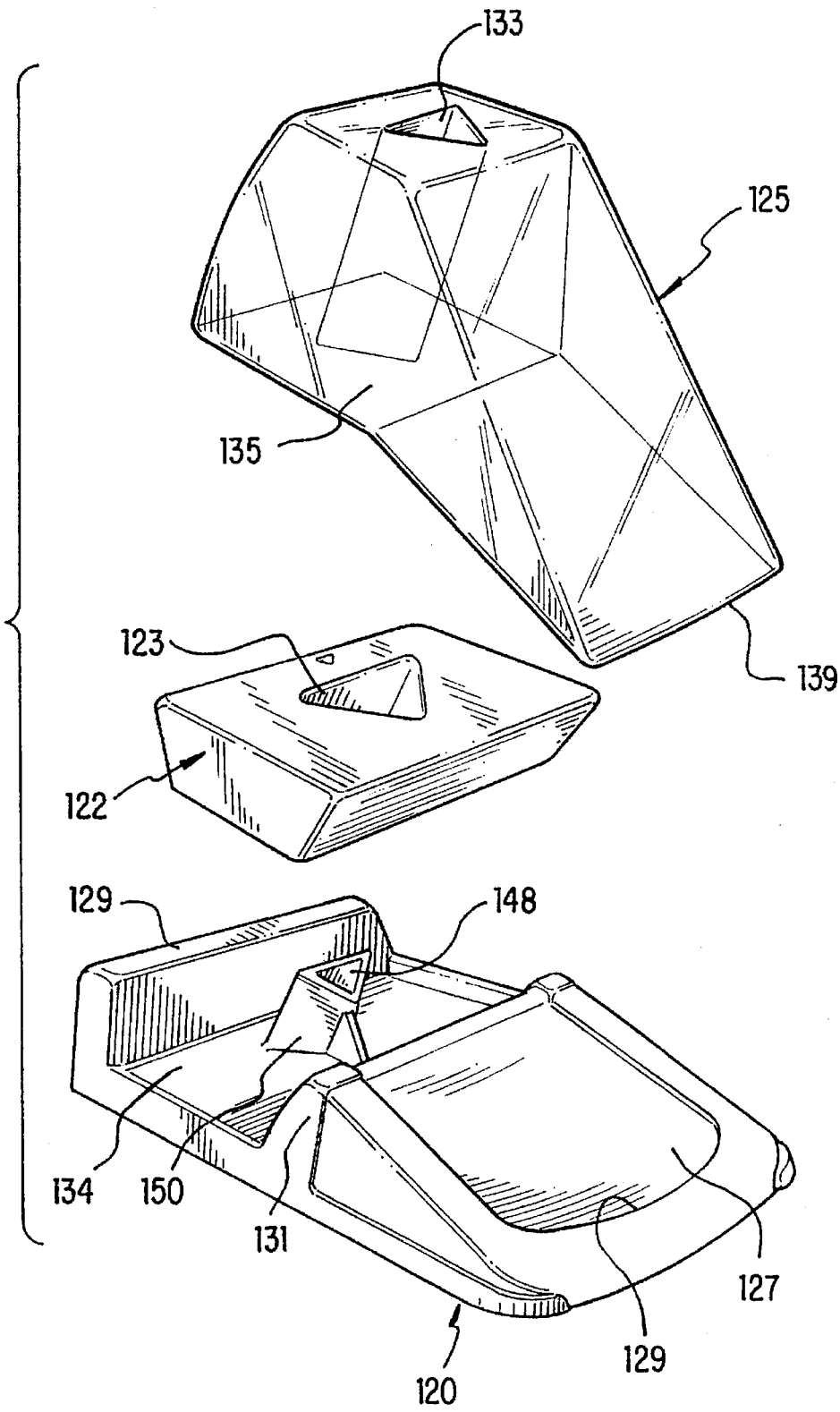
FIG. 12 is an exploded view of the support of FIG. 11.

Referring to FIGS. 11 and 12, an alternative embodiment for the support is illustrated. The support 110 of the alternative embodiment includes a goal 112 supported on a support pole 124, and the support pole 124 is engaged with a base 120. The goal 112 and support pole 124 may be of substantially the same construction as the previous embodiment with the exception that the pole 124 of the present invention is formed having a straight lower end rather than the angled lower end of the previous embodiment.

Referring in particular to FIG. 12, the base 120 includes a support shell 150 having an aperture 148 for receiving the support pole 124. The shell 150 defines a pole mount located on the base 120, and the shell 150 is located within a ballast receiving area 134. The ballast receiving area 134 is located between a rear wall portion 129 and a front wall portion 131.

A ballast 122 is provided and is in the form of a substantially rectangular shaped tank which may be filled with a fluid such as water. The ballast 122 includes an aperture 123 for receiving the pole mount shell 150 therethrough. The rear wall 129, front wall 131 and shell 150 facilitate aligning and maintaining the ballast 122 in position within the ballast receiving area 134.

An air bladder member 125 is also provided and is preferably formed of a flexible, relatively thin plastic material which is conducive to inflation. The bladder 125 is adapted to rest on top of the ballast 122, as well as on top of a front surface 127 of the base 120. The front surface 127 is preferably formed as a concave surface to accommodate bulging or billowing of the air bladder member 125. In addition, the front surface 127 preferably extends under a front ledge 129 of the base 120, and a front edge 139 of the air bladder 125 is accommodated underneath the front ledge 129 to thereby facilitate maintaining the front edge of the air bladder 125 in position on the base 120.

The air bladder 125 further includes an aperture 133 therethrough for receiving the pole 124 as it passes into mounting engagement within the mounting aperture 148 of the base 120. When inflated, the air bladder 125 facilitates maintaining the support pole 124 in position in that the surfaces defining the aperture 133 expand and grip the pole 124. In addition, the air bladder 125 may be provided with a planar brace 135 located inside the air bladder 125.

It should be noted that the air bladder 125 is preferably formed of a transparent material such that the brace 135 may be seen through the walls of the bladder 125. In addition, the brace 135 may be provided with printed graphics to enhance the appearance of the support 110.

This embodiment of the basketball goal support 110 provides similar advantages to the previous embodiment in that a removable ballast 122 is provided for facilitating filling and/or emptying of the ballast 122. In addition, an air bladder 125 is provided for facilitating supporting of the pole 124 as well as providing an attractive bulging appearance to the top of the support when the air bladder 125 is inflated.

Figure 13:
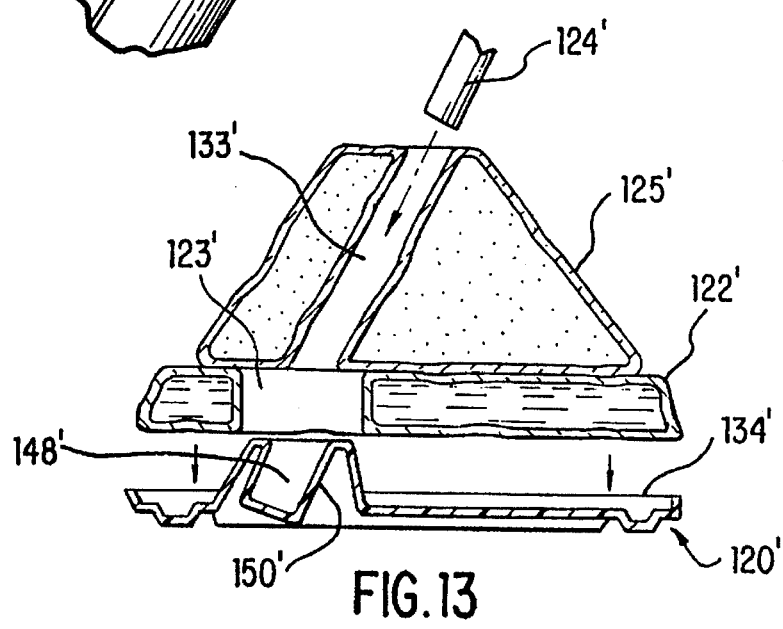
FIG. 13 is an exploded cut-away view of a support similar to the support in FIG. 11 wherein the ballast and air bladder are formed as a single unit.

Referring to FIG. 13, a further embodiment of the basketball support of the present invention is shown similar to the embodiment of FIGS. 11 and 12 wherein elements of the present embodiment corresponding to the embodiment of FIGS. 11 and 12 are labeled with the same reference numeral primed. As seen in FIG. 13, the support includes a base 120' for receiving a ballast assembly comprising a water bladder 122' and an air bladder 125'. The water bladder 122' and air bladder 125' are preferably formed as a multiple chamber bladder member wherein the water bladder 122' and air bladder 125' are formed of the same thin, flexible plastic material and are connected to each other to form a unit having separate bladder chambers. Thus, the water bladder 122' is formed as a flexible member for holding water, and the air bladder 125' is formed as a similar flexible member for being inflated with air.

The assembly comprising the water bladder 122' and air bladder 125' is received on a ballast receiving area 134' of the base 120' and includes an aperture 123' for receiving a pole mount shell 150' having an aperture 148' for receiving the support pole 124'. In addition, the air bladder 125' defines an aperture 133' for receiving the pole 124' therethrough.

As in the previous embodiment, the air bladder 125' is adapted to provide further support to the pole 124' when it is engaged within the aperture 148' of the base 120'. In addition, the flexible walls of the water bladder 122' surrounding the aperture 123' may deform to positively engage around the shell 150' to thereby facilitate maintaining the water and air bladder structure in position on the base 120'. It should be noted that the air bladder 125' may also be filled with water instead of air whereby further ballast weight is provided. In addition, it should be noted that the ballast 122' and 125' may be provided with apertures or conventional valves (not shown) for permitting filling of the interior areas of these bladders.

Figure 14:
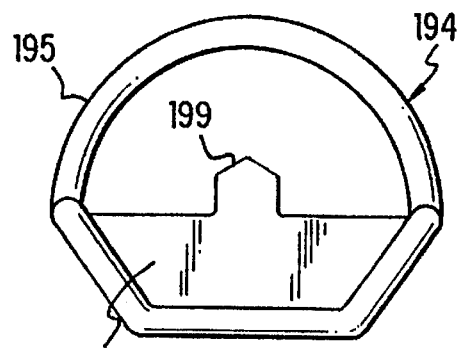
FIG. 14 shows an alternative embodiment of a positioning band for use in adjusting the height of the support pole.
Figure 15:
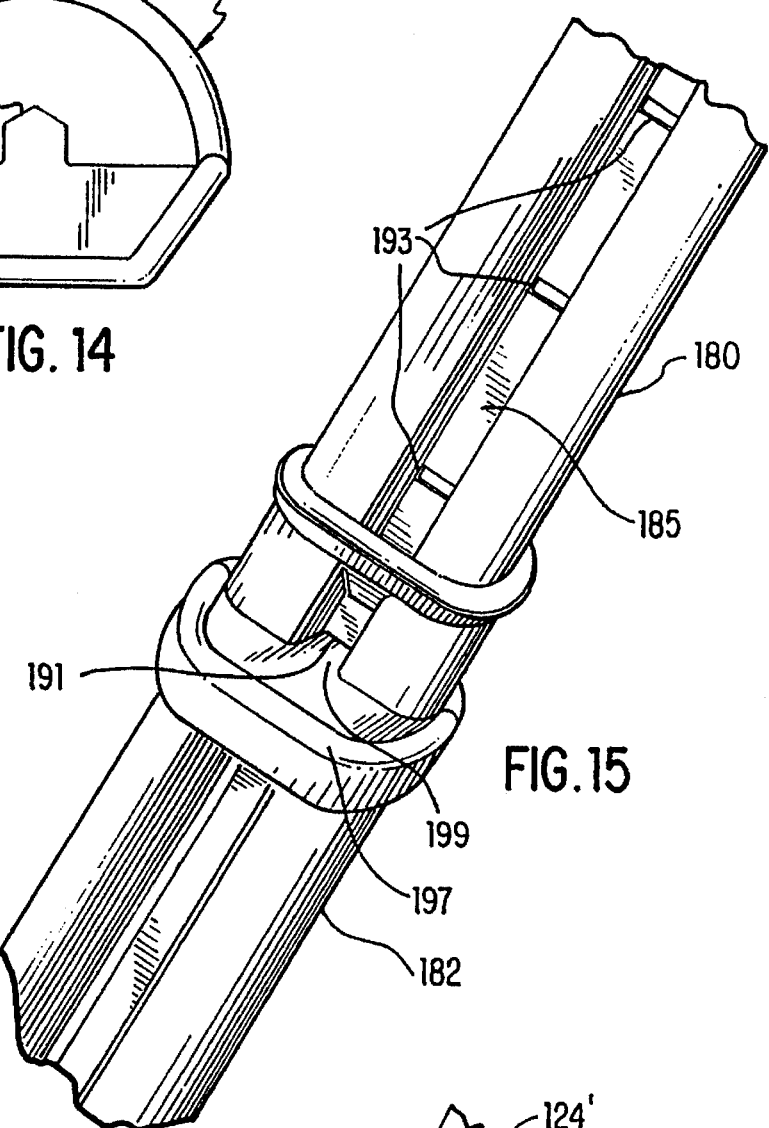
FIG. 15 is a rear perspective view showing the band of FIG. 14 in position on a portion of the support pole.

Referring to FIGS. 14 and 15, an alternative embodiment of the positioning band for locating the height of the support pole is illustrated. The positioning band 194 of the present embodiment includes a flexible band portion 195 and a handle portion 197. The band portion 195 and handle portion 197 are preferably formed integrally with each other of a resilient material such as SANTOPRENE. The handle portion 197 includes an engagement or locking finger 199 which is adapted to pass through an aperture 191 formed in the lower tube 182 and into engagement in one of a plurality of positioning notches 193 formed in the upper tube 180. It should be noted that the upper and lower tubes 180 and 182 have substantially the same configuration as the tubes 80, 82 of the previous embodiment, with the exception of the addition of aperture 191 and notches 193.

As shown in FIG. 15, the positioning band 194 extends around the lower tube 182 with the finger 199 extending into the aperture 191. When it is desired to adjust the upper tube 180 to a different position, the handle 197 may be pulled outwardly away from the lower tube 182 to thereby disengage the finger 199 from the notches 193 in the upper tube 180. Upon releasing the handle 197, the band portion 195 will cause the finger 199 to again move into engagement within one of the notches 193 for locking the upper tube 180 into position relative to the lower tube 182. Groove 185 allows locking finger 199 to move easily from notch to notch. It should be noted that this embodiment of the positioning band 194 provides an advantage similar to the previous embodiment in that the positioning band 194 is maintained in position around the support pole thereby reducing the chance of the locking means for the support pole becoming lost or misplaced.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A portable basketball backboard and goal assembly, including a pole, a backboard supported on the pole, and a goal supported on the backboard, said assembly comprising:

a base for supporting the pole, said base including a first surface disposed in a first plane defining at least part of a ballast receiving area, said first surface including structure configured to engage a portion of a ballast tank; and a substantially closed, hollow ballast tank separable from said base, said ballast tank being fillable with ballast material for weighting down said base, and said ballast tank including a second surface having a portion latchingly engageable with said first surface to lock said ballast tank to said base in a predetermined position within said ballast receiving area, said first and second surfaces cooperating to define a pivotal connection between said base and said ballast tank wherein the latchingly engageable portion of the second surface is positioned on the opposite side of the first plane from the remainder of the ballast tank, whereby the ballast tank is moved along a first direction to position the latchingly engageable portion relative to the structure of the base and then pivoted to latchingly engage the first and second surfaces.

2. The basketball goal assembly as recited in claim 1, wherein said first and second surfaces comprise an aperture having an edge formed in one of said base and ballast tank and a latching surface formed on the other of said base and said ballast tank, said latching surface engaging the edge of said aperture to limit movement of said ballast tank.

3. The basketball goal assembly as recited in claim 2, wherein said ballast tank comprises a fill spout and a latching collar formed on said fill spout, said latching collar defining said latching surface.

4. The basketball goal assembly as recited in claim 1, further comprising openings formed on one of said base and said ballast tank, and projections formed on the other of said base and said ballast tank, said projections being resiliently engageable in said openings.

5. The basketball goal assembly according to claim 4, wherein said projections comprise snap tabs.

6. The basketball goal assembly as recited in claim 1, wherein said base comprises an elongated projection within said ballast receiving area, and said ballast tank comprises an elongated recess for receiving said elongated projection.

7. The basketball goal assembly according to claim 6, wherein said elongated projection comprises a ramp portion extending downwardly in a rear to front direction.

8. The basketball goal assembly as recited in claim 1, further comprising a pole mount located at a rearward end of said base, said pole mount defining an aperture for receiving the pole.

9. The basketball goal assembly as recited in claim 1, wherein the pole comprises an upper tube and a lower tube and an elastomeric band extending around said upper tube for cooperation with an upper end of said lower tube, said elastomeric band being movable to a substantially infinite number of positions along said upper tube to maintain said upper tube in a selected position relative to said lower tube.

10. The basketball goal assembly as recited in claim 1, further comprising an inflatable air bladder disposable over said ballast tank.

11. The basketball goal assembly as recited in claim 1, wherein said ballast tank comprises a multiple chamber bladder.

12. The basketball goal assembly as recited in claim 11, wherein said multiple chamber bladder comprises at least a chamber for water and a chamber for air.

13. The basketball goal assembly as recited in claim 1, wherein said base includes an upwardly extending portion defining at least part of an outer peripheral boundary of said ballast receiving area.

14. The basketball goal assembly as recited in claim 13, wherein said upwardly extending portion comprises flanges defining opposing sides of said ballast receiving area.

15. A portable basketball backboard and goal assembly, including a backboard and a goal supported on said backboard, said assembly comprising:

a base;

a plastic pole for supporting said backboard from said base, said pole including an upper tube having an outer periphery and a lower tube having an inner periphery disposed in overlapping telescoping relationship and substantially contacting the outer periphery of the upper tube along substantially the entire length of overlap, and an outwardly angled lip extending from an upper portion of said lower tube, said upper tube having a height adjusting surface of predetermined length; and an elastomeric band extending around said pole frictionally engageable in any position along said height adjusting surface, said elastomeric band limiting movement of said upper tube into said lower tube.

16. The basketball goal assembly as recited in claim 15, wherein said upper tube includes a plurality of positioning indicia providing predetermined reference locations for locating said elastomeric band whereby said upper tube is positioned at a selected height relative to said base.

17. The basketball goal assembly as recited in claim 16, wherein said positioning indicia comprises dimples formed at longitudinally spaced locations along the length of said height adjusting surface of said upper tube.

18. The basketball goal assembly as recited in claim 15, wherein said upper and lower tubes have a non-circular cross-section whereby relative rotation between said upper and lower tubes is prevented.

19. The basketball goal assembly as recited in claim 18, wherein said upper and lower tubes have a rounded triangular cross-sectional shape.

20. The basketball goal assembly as recited in claim 15, wherein said lower tube includes radially extending locking tangs and said base includes an aperture for receiving said pole, said aperture including openings for receiving said tangs.

21. The basketball goal assembly as recited in claim 15, wherein said upper tube includes a goal mounting bracket for mounting the basketball backboard.

22. The basketball goal assembly as recited in claim 15, further comprising a hollow ballast tank removably supported on said base, said ballast tank being fillable with ballast material.

23. A portable basketball backboard and goal assembly, including a backboard and a goal supported on said backboard, said assembly comprising:
   a base;
   a pole for supporting said backboard from said base, said pole including an upper tube and a lower tube, said upper tube extending in telescoping relationship within said lower tube;
   a longitudinal groove formed in at least one of the upper and lower tubes; and
   a band extending around said pole limiting movement of said upper tube into said lower tube, said band including a handle having a locking finger and a resilient band portion, said lower tube including an aperture and said upper tube including a plurality of notches, wherein said aperture and said plurality of notches are adapted to receive said locking finger to position said upper tube relative to said lower tube, and said longitudinal groove is adapted to receive said locking finger to facilitate movement of said finger between notches.

24. A basketball goal support comprising:
   a base including an upper surface and a pole mount located at a rearward end of said base, a pair of flange portions extending forwardly from said pole mount in a longitudinal direction along opposing sides of said base wherein said pole mount and said flange portions define a ballast receiving area on said upper surface;
   a ramp portion extending forwardly and downwardly from said pole mount, said ramp portion including opposing sides and snap openings defined in said opposing sides adjacent to said upper surface;
   a ballast tank including a lower planar surface configured to rest on said upper surface in said ballast receiving area of said base, an elongated recess for receiving said ramp portion, a fill spout located adjacent to a rear end of said ballast tank and including a latching collar, and snap tabs extending into said elongated recess for engaging within said snap openings;
   said base including means defining a keyhole aperture for receiving said latching collar wherein said means defining said keyhole aperture includes an upper edge for engaging a forward edge of said latching collar to limit forward movement of said ballast tank within said ballast receiving area;
   a pole comprising an upper tube and a lower tube, said upper and lower tubes having a rounded triangular cross-sectional shape;
   said lower tube including radially extending locking tangs located at a lower end thereof, and an outwardly angled lip at an upper end of said lower tube;
   said upper tube including a goal mounting bracket at an upper end thereof, and a plurality of positioning dimples formed at longitudinally spaced locations along the length of said upper tube defining a plurality of predetermined positions along said upper tube,
   an elastomeric band extending around said upper tube;
   a pole mounting aperture formed in said pole mount and tang openings defined in within said pole mounting aperture for receiving said locking tangs in locking engagement; and
   wherein said elastomeric band is movable to an infinite number of positions along said upper tube and is engageable with said lip on said lower tube to maintain said upper tube in a selected position relative to said lower tube.

25. A portable basketball backboard and goal assembly, including a pole, a backboard supported on the pole, and a goal supported on the backboard, said assembly comprising:
   a substantially closed, hollow ballast tank;
   a base for supporting the pole, said base including an exterior contour having a ballast receiving area for receiving and retaining said ballast tank; and
   wherein said ballast tank is separable from said base and includes a base receiving area formed integrally therewith, said ballast receiving area and said base receiving area being engageable to form the sole structural elements cooperating together to lock said ballast tank in position relative to said base, and said ballast tank being fillable with ballast material prior to being engaged with said base for weighting down said base, said ballast tank being engageable and removable from said base without disassembly of any other components of said portable basketball backboard and goal assembly to facilitate filling and emptying said tank.

26. The portable assembly of claim 25 wherein said exterior contour comprises an upper surface of said base bounded by upwardly extending portions of said base defining therein a ballast receiving area.

27. The portable assembly of claim 26 wherein said upwardly extending portions of said base include a pair of opposed flanges and a pole mount disposed between the flanges, said pole mount including at least one recessed area configured to receiving at least one complementary portion of said ballast tank.

28. The portable assembly of claim 27 wherein said upper surface includes an upwardly extending projection configured to be received within a complementary portion of said ballast tank.

29. The portable assembly of claim 25 wherein the structural elements cooperating to lock said ballast tank in position relative to said base comprise openings formed in one of said base and ballast tank, and projections formed on the other of said base and ballast tank, said projections being resiliently engageable in said openings to limit movement of said ballast tank.

30. The portable assembly of claim 25 wherein the structural elements cooperating to lock said ballast tank in position relative to said base comprise an aperture having an edge formed in one of said base and ballast tank and a latching surface formed on the other of said base and ballast tank, said latching surface engaging the edge of said aperture limit movement of said ballast tank.

31. A basketball goal support comprising:

a base for supporting a pole, said base including a surface defining a ballast receiving area;

a ballast for positioning on said surface within said ballast receiving area for weighting down said base; and wherein said ballast is removable from said base, and said ballast and said base include openings formed on one of said base and said ballast, and snap tabs formed on the other of said base and said ballast for engaging in said openings to maintain said ballast within said ballast receiving area.

32. A basketball goal support comprising:

a base for supporting a pole, said base including a surface defining a ballast receiving area;

a ballast for positioning on said surface within said ballast receiving area for weighting down said base;

wherein said ballast is removable from said base, and said ballast and said base include cooperating member maintaining said ballast within said ballast receiving area; and an inflatable air bladder located over said ballast.

33. A basketball goal support comprising:

a base for supporting a pole, said base including a surface defining a ballast receiving area;

a ballast formed as a multiple chamber bladder for positioning on said surface within said ballast receiving area for weighting down said base; and wherein said ballast is removable from said base, and said ballast and said base include cooperating means for maintaining said ballast within said ballast receiving area.

34. The support as recited in claim 33 wherein said multiple chamber bladder comprises at least a chamber for water and a chamber for air.

* * * * *